United States Patent
Sasaki

(10) Patent No.: US 9,802,350 B2
(45) Date of Patent: Oct. 31, 2017

(54) OPENING/CLOSING APPARATUS AND MOLDING APPARATUS

(71) Applicant: Toshiba Kikai Kabushiki Kaisha, Tokyo (JP)

(72) Inventor: Noriyuki Sasaki, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/321,009

(22) PCT Filed: Jul. 1, 2015

(86) PCT No.: PCT/JP2015/068975
§ 371 (c)(1),
(2) Date: Dec. 21, 2016

(87) PCT Pub. No.: WO2016/002836
PCT Pub. Date: Jan. 7, 2016

(65) Prior Publication Data
US 2017/0203482 A1    Jul. 20, 2017

(30) Foreign Application Priority Data
Jul. 1, 2014    (JP) ................................. 2014-135998

(51) Int. Cl.
*B29C 45/66*    (2006.01)
*B22D 17/26*    (2006.01)

(52) U.S. Cl.
CPC ............ *B29C 45/661* (2013.01); *B22D 17/26* (2013.01); *B22D 17/263* (2013.01); *B29C 2045/665* (2013.01)

(58) Field of Classification Search
CPC ..... B29C 45/661; B29C 45/681; B29C 33/20; B22D 17/263
See application file for complete search history.

(56) References Cited

U.S. PATENT DOCUMENTS

| 5,178,888 A * | 1/1993 | Wurl ..................... B29C 45/661 |
| | | 425/451.5 |
| 6,419,861 B1 | 7/2002 | Stirn et al. |
| 9,011,130 B2 * | 4/2015 | Senga ..................... B29C 45/66 |
| | | 100/281 |

FOREIGN PATENT DOCUMENTS

| JP | 7-1526 | * 1/1995 |
| JP | 07-205237 | 8/1995 |

(Continued)

OTHER PUBLICATIONS

Written Opinion (with English Translation) issued in International Application No. PCT/JP2015/068975 dated Sep. 15, 2015.

(Continued)

*Primary Examiner* — James Mackey
(74) *Attorney, Agent, or Firm* — DLA Piper LLP US

(57) ABSTRACT

The present invention aims to stably maintain the posture of a crosshead by means of guide bars without an increase in the size of a link housing or tie bars. An opening/closing apparatus according to the present invention includes: a pressure-receiving plate (14); a fixed platen (12) to which a fixed mold (18) is to be mounted; a frame (11) on which the pressure-receiving plate (14) and the fixed platen (12) are installed; and a movable platen (16) which is movable on the frame (11) and to which a movable mold (19) is to be mounted. The opening/closing apparatus also includes: a crosshead movement mechanism including guide members (50) extending from the pressure-receiving plate (14), and a crosshead (25) whose movement is guided by the guide members (50); an opening/closing mechanism for opening/closing a mold, including a toggle link mechanism (22) connecting the pressure-receiving plate (14), the crosshead (25) and the movable platen (16), and a drive mechanism for driving the toggle link mechanism (22); and a guide member support mechanism for supporting the guide members (50). The guide member support mechanism has support portions (56) which are slidable on the upper surface of the frame (11).

10 Claims, 4 Drawing Sheets

(56) References Cited

FOREIGN PATENT DOCUMENTS

| JP | 09-164570 | 6/1997 |
| JP | 10-305465 | 11/1998 |
| JP | 2003-033955 | 2/2003 |
| JP | 2003-266503 | 9/2003 |
| JP | 2004-330780 | 11/2004 |
| JP | 2008-296384 | 12/2008 |
| JP | 2011-051249 | 3/2011 |

OTHER PUBLICATIONS

International Preliminary Report on Patentability issued in International Application No. PCT/JP2015/068975 dated Jan. 3, 2017.
Japanese Office Action (with English Translation) issued in JP 2014-135998 dated Feb. 17, 2017.
English language Abstract and Translation of JP 2004-330780 published on Nov. 25, 2004.
English language Abstract and Translation of JP 2008-296384 published on Dec. 11, 2008.
English language Abstract and Translation of JP 2011-051249 published on Mar. 17, 2011.
English language Abstract and Translation of JP 2003-266503 published on Sep. 24, 2003.
International Search Report (with English Translation) issued in International Application No. PCT/JP2015/068975 dated Sep. 15, 2015.
English language Abstract of JP 10-305465 published on Nov. 17, 1998.
English language Abstract of JP 2003-033955 published on Feb. 4, 2003.
English language Abstract of JP 07-205237 published on Aug. 8, 1995.
English language Abstract of JP 09-164570 published on Jun. 24, 1997.

\* cited by examiner

OPENING/CLOSING APPARATUS AND MOLDING APPARATUS

CROSS REFERENCE TO RELATED APPLICATIONS

This application is a U.S. National Stage Application of International Application No. PCT/JP2015/068975 filed Jul. 1, 2015, which claims priority from Japanese Patent Application No. 2014-135998 filed Jul. 1, 2014. The entirety of all the above-listed applications are incorporated herein by reference.

TECHNICAL FIELD

Embodiments of the present invention relate to a toggle-type mold clamping apparatus and a molding apparatus.

BACKGROUND ART

Molding apparatuses, such as injection molding machines and die-cast machines, comprise a mold clamping apparatus in which a mold, consisting of a fixed mold and a movable mold, is to be mounted, and an injection apparatus. The mold clamping apparatus includes a fixed platen to which the fixed mold is to be mounted, and a movable platen to which the movable mold is to be mounted. There are various types of known mold clamping apparatuses. A typical one is a toggle-type mold clamping apparatus which moves a movable platen back and forth along tie bars through extension/contraction of a power-driven toggle link mechanism, thereby closing, clamping and opening a mold.

The toggle link mechanism of such a toggle-type mold clamping apparatus is a link mechanism connecting a pressure-receiving plate, a crosshead having a ball nut, and a movable platen. The ball nut is in engagement with a ball screw which is driven by an electric motor, so that rotation of the ball screw is converted into linear movement of the crosshead. The toggle link mechanism can thus be extended/contracted to move the movable platen back and forth.

When the toggle link mechanism of the toggle-type mold clamping apparatus is locked up to clamp the mold, a reaction force acts on a link housing provided in the pressure-receiving plate. Therefore, improvements have heretofore been made to a support structure for the ball screw or to a support structure for maintaining the posture of the crosshead.

For example, the ball screw is cantilever-supported by the link housing; the front end of the ball screw is not supported. Therefore, flexure or deflection is likely to occur in the ball screw upon actuation of the toggle link mechanism, which may result in a decrease in the life of the ball nut. In order to prevent flexure or deflection of such a ball screw, Japanese Patent Laid-Open Publication No. 2003-33955, for example, has proposed a support structure provided with a support bearing for supporting the front end of the ball screw.

In the toggle-type mold clamping apparatus, upon the lock-up operation which generates a mold clamping force, a reaction force to the mold clamping force is transmitted to the crosshead via the link mechanism. The posture of the crosshead then becomes unstable and the crosshead can sometimes tilt if the rigidity of a support structure for the crosshead is low.

In view of this, in such a conventional toggle-type mold clamping apparatus, a support structure for the crosshead has been proposed which includes guide bars for guiding back-and-forth movement of the crosshead, the guide bars each being supported by an arm of a link housing.

DISCLOSURE OF INVENTION

Regarding the above-described structure in which the guide bars for the crosshead are supported by the arms of the link housing, a long stroke of the crosshead in the case of a large-sized mold clamping apparatus necessitates a long length of the arms of the link housing, making the link housing a large-sized structure.

Accordingly, the production of the link housing by casting becomes difficult. In addition, because of a long distance between support holes for the guide bar, it is difficult to machine the holes with high accuracy of concentricity. Further, a considerable error can be produced in the parallelism of two guide bars.

Further, upon the lock-up operation which generates a mold clamping force, a reaction force to the mold clamping force is transmitted to the crosshead. This can deform the link housing, causing a displacement of the support arms toward the center of the machine. Since the length of each arm of the link housing is long in the case of a large-sized mold clamping apparatus, the displacement of the arms is large. This may result in an increase in the surface pressure of a guide bush that fits around the guide bar, causing damage to the guide bar due to early wear.

The present invention has been made in view of the above problems in the prior art. It is therefore an object of the present invention to provide an opening/closing apparatus and a molding apparatus which can stably maintain the posture of a crosshead by means of guide bars without an increase in the size of a link housing or tie bars.

In order to achieve the object, an opening/closing apparatus according to the present invention comprises: a pressure-receiving plate; a fixed platen to which a fixed mold is to be mounted; a frame on which the pressure-receiving plate and the fixed platen are installed; a movable platen which is movable on the frame and to which a movable mold is to be mounted; a crosshead movement mechanism including guide members extending from the pressure-receiving plate, and a crosshead whose movement is guided by the guide members; an opening/closing mechanism for opening/closing a mold, including a toggle link mechanism connecting the pressure-receiving plate, the crosshead and the movable platen, and a drive mechanism for driving the toggle link mechanism; and a guide member support mechanism for supporting the guide members, wherein the guide member support mechanism has support portions which are slidable on the upper surface of the frame.

A molding apparatus according to the present invention comprises the above-described opening/closing apparatus.

MODE FOR CARRYING OUT THE INVENTION

Embodiments of the opening/closing apparatus and the molding apparatus according to the present invention will now be described with reference to the drawings.

First Embodiment

Figure 1:
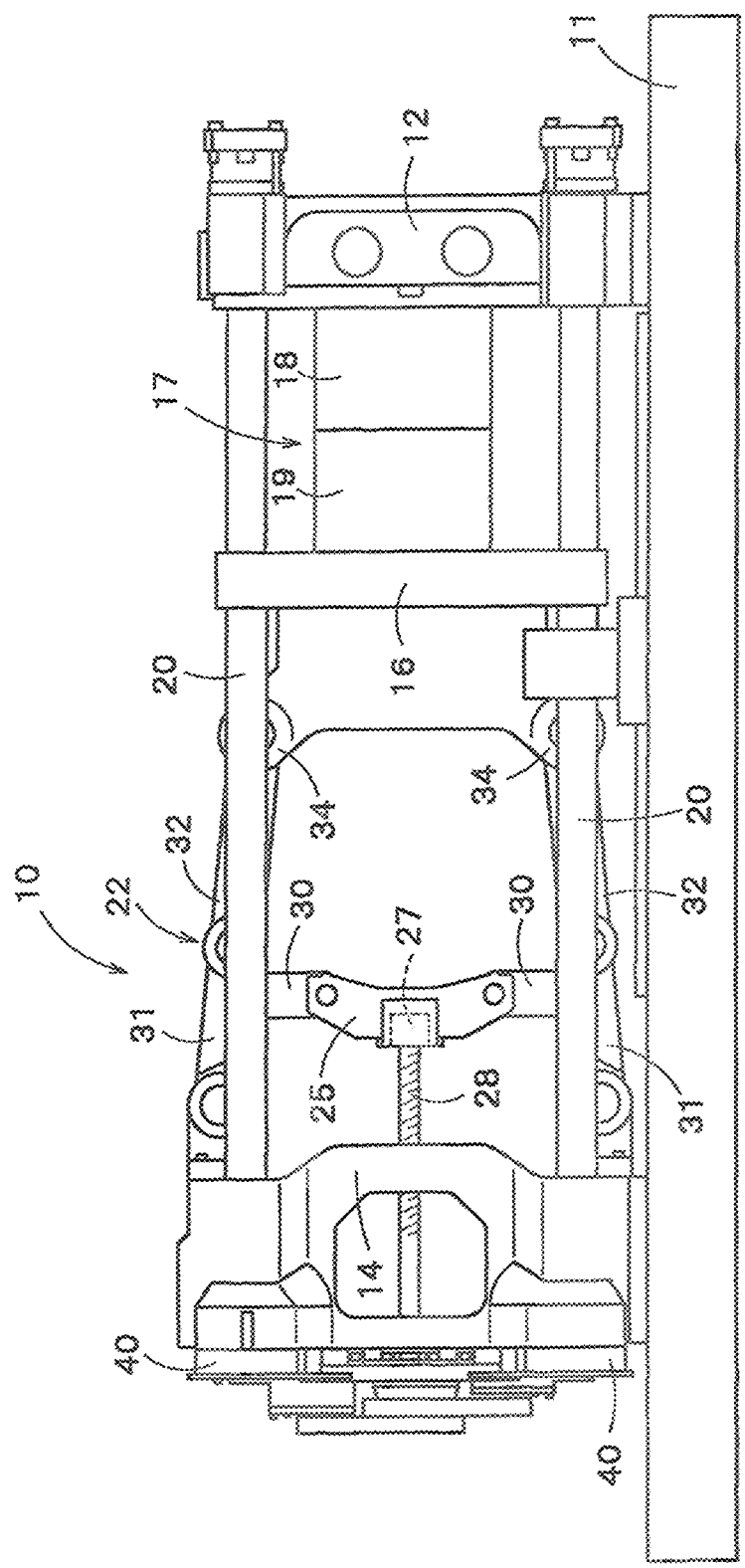
FIG. 1 is a side view schematically showing a mold clamping apparatus to which the present invention is applied.

FIG. 1 schematically shows a mold clamping apparatus for use in an injection molding machine (molding apparatus), to which the present invention is applied. In FIG. 1, reference numeral 10 denotes the entire mold clamping apparatus.

The mold clamping apparatus (opening/closing apparatus, mold opening/closing apparatus) 10 includes, for example, a fixed platen 12 fixed on the anterior side of a frame 11, a link housing (pressure-receiving plate) 14 installed on the posterior side of the frame 11, and a movable platen 16 movably installed between the fixed platen 12 and the link housing 14. A fixed mold 18 is mounted to the fixed platen 12, while a movable mold 19, disposed opposite the fixed mold 18, is mounted to the movable platen 16.

The fixed platen 12 and the link housing 14 are connected by a plurality of (e.g. four) tie bars 20. The movable platen 16 moves back and forth along the tie bars 20.

In this embodiment the mold clamping apparatus 10 is configured as a toggle-type mold clamping apparatus which generates a mold clamping force with a toggle link mechanism 22.

In FIG. 1, reference numeral 25 denotes a crosshead. The crosshead 25, at its center, has a nut portion 27 that constitutes a drive mechanism for driving the toggle link mechanism 22. The nut portion 27 is configured to engage a ball screw 28. The ball screw (drive mechanism) 28 is driven by a not-shown servo motor (drive section).

The toggle link mechanism 22 includes a pair of upper and lower toggle links. Each toggle link includes links 30, 31 and 32. In each toggle link, one end of the link 30 is connected to the crosshead 25, one end of the link 31 is connected to the link housing 14, and one end of the link 32 is connected to a toggle link joint 34 provided behind the movable platen 16. When the crosshead 25 moves linearly by means of the ball screw 28 and the nut portion 27, the toggle link mechanism 22 extends/contracts to move the movable platen 16 back and forth and to transmit a mold clamping force to the movable platen 16.

Referring to FIG. 1, in the link housing 14, the ends of the tie bars 20 are each held by a nut 40. In the case of a toggle-type mold clamping apparatus, it is necessary to change the position of connection between each tie bar 20 and the nut 40 according to the thickness of a mold 17 upon replacement with the mold 17. The mold clamping apparatus 10 is therefore provided with a known mold thickness adjustment mechanism.

The mold clamping apparatus 10 has the above-described basic construction. In addition, the mold clamping apparatus of this embodiment is provided with crosshead guide bars which support the crosshead 25 and guide back-and-forth movement of the crosshead 25. The crosshead guide bars constitute a crosshead movement mechanism. The mold clamping apparatus 10 is also provided with a support structure for the crosshead guide bars.

The support structure for the crosshead guide bars will now be described with reference to FIGS. 2 and 3.

Figure 2:
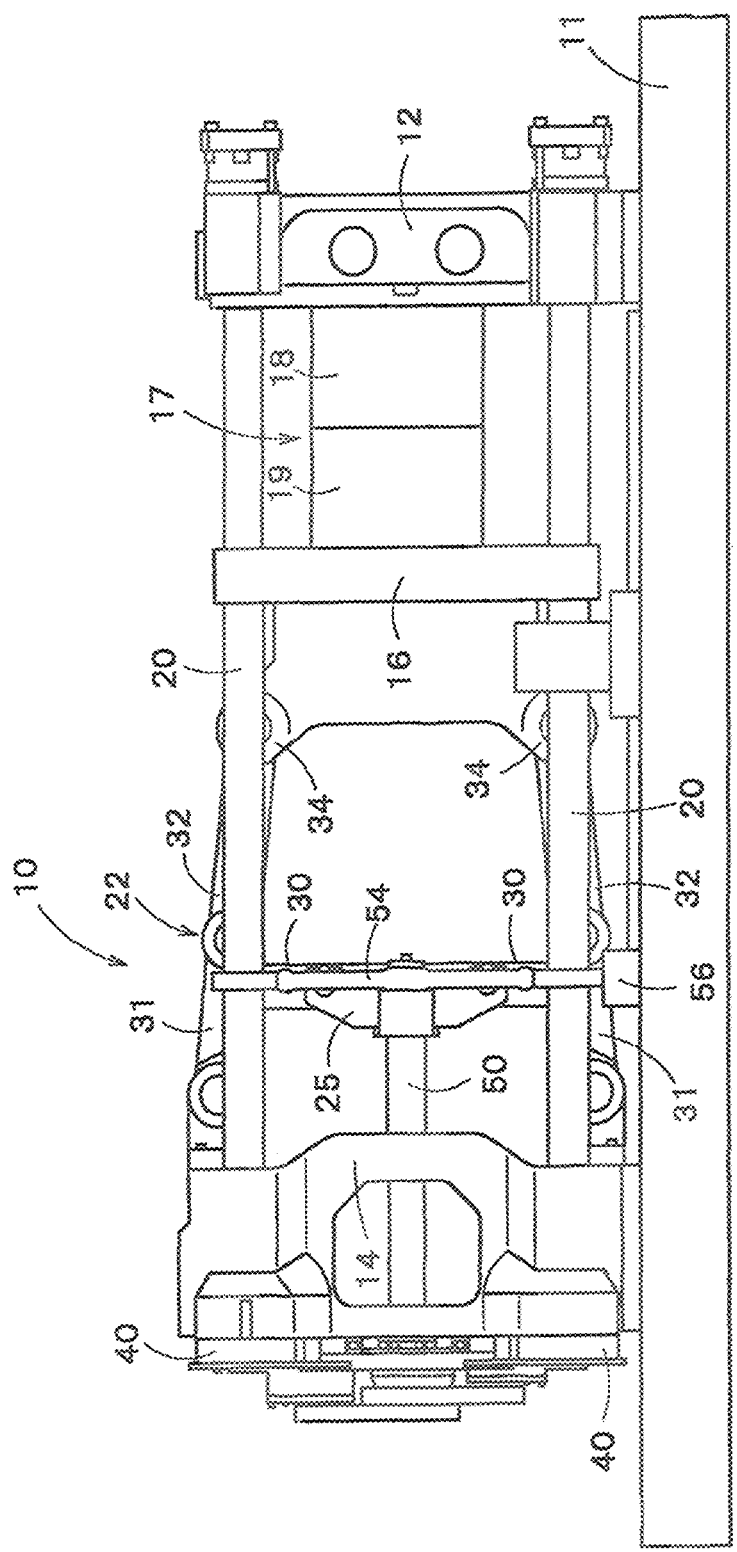
FIG. 2 is a side view of an opening/closing apparatus according to a first embodiment of the present invention.

In FIG. 2, reference numeral 50 denotes a crosshead guide bar. The crosshead guide bar (guide bar, guide member) 50 may be provided in plural numbers; for example, a total of two crosshead guide bars 50 are provided on both sides of the crosshead 25. One end of each crosshead guide bar 50 is secured to the link housing 14, and the crosshead guide bars 50 extend parallel to the tie bars 20.

Figure 3:
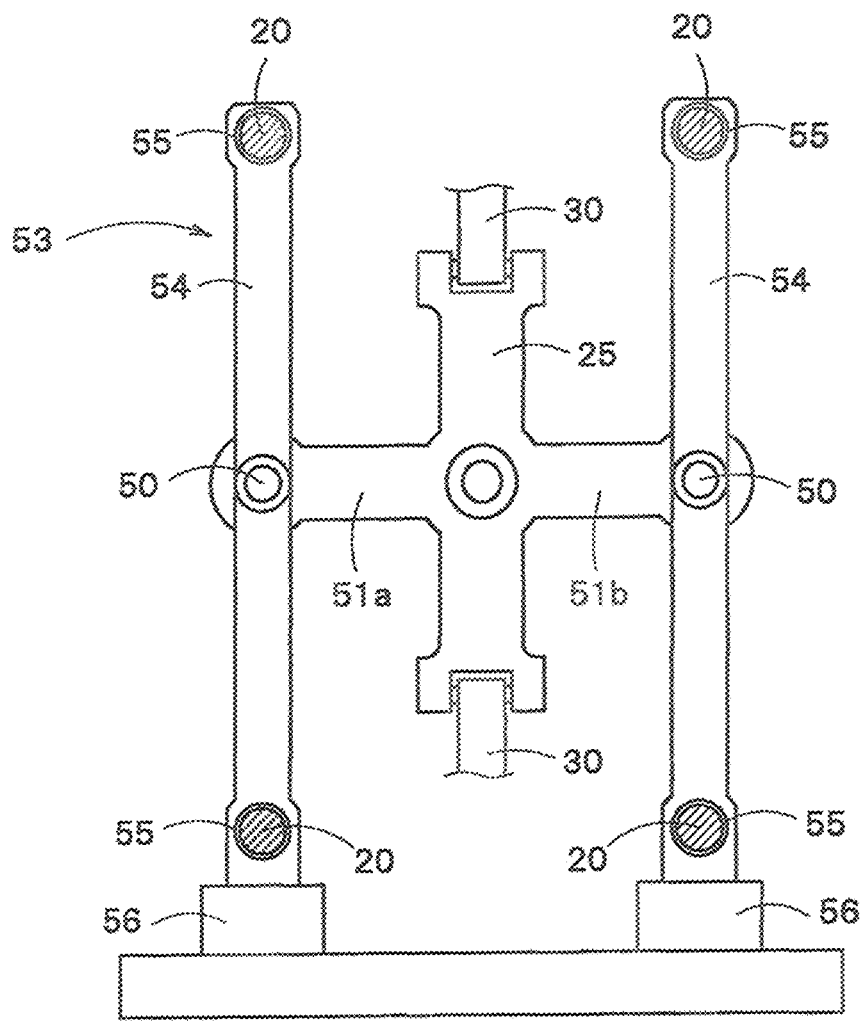
FIG. 3 is a diagram of a crosshead as viewed from a movable platen.

FIG. 3 is a diagram of the crosshead 25 as viewed from the movable platen 16. Of a plurality of, e.g. four, arms of the crosshead 25, horizontally-extending arms 51a, 51b have holes formed at their front ends. The holes each slidably fit around the crosshead guide bar 50. The front ends of the crosshead guide bars 50 are supported by a guide bar support mechanism 53. In this embodiment the guide bar support mechanism (guide member support mechanism) 53 includes, for example, a pair of columnar guide bar support members (guide member support members) 54 and a pair of support blocks (support portions) 56. The front end of each crosshead guide bar 50 is secured to the guide bar support member 54. Guide bushes 55 are mounted in upper and lower end portions of the guide bar support member 54. The tie bars 20 slidably fit into the guide bushes 55.

The support blocks 56 each support the guide bar support member 54 and are slidable on the upper surface of the frame 11. The guide bar support member 54 may be formed integrally with the support block 56.

The operation and the effect of the thus-constructed mold clamping apparatus of this embodiment will now be described.

In the mold clamping apparatus 10 of this embodiment, each crosshead guide bar 50 for supporting and guiding the crosshead 25 is secured, at its base end, to the link housing 14 and supported, at its front end, by the guide bar support member 54. The guide bar support member 54 is supported via the support block 56 on the frame 11.

The position of each guide bar support member 54 remains unchanged while the mold clamping apparatus 10 is performing the operation of closing, clamping or opening the mold. The guide bar support members 54, at the positions shown in FIG. 2, can support the two crosshead guide bars 50 horizontally and parallel to each other.

While the toggle link mechanism 22 is extending or contracting and the crosshead 25 is moving, the crosshead 25 is held stably in a vertical position and no biased load is applied to the guide bushes 55 (see FIG. 3) sliding on the tie bars 20.

A mold clamping force is generated when the toggle link mechanism 22 is brought into the lock-up state. The reaction force to the mold clamping force is transmitted from the toggle link mechanism 22 to the link housing 14, and the transmitted force can cause deformation of the link housing 14.

Since the guide bar support members 54 are different members from the link housing 14, the force that deforms the link housing 14 is not transmitted to the guide bar support members 54. Thus, the reaction force to the mold clamping force can be prevented from losing the posture of the crosshead 25.

On the other hand, when the toggle link mechanism 22 is in the lock-up state which generates the mold clamping force, the load of the weight of the heavy crosshead 25 is applied to the guide bar support members 54.

If the guide bar support members 54 are supported by the upper and lower tie bars 20, the weight of the crosshead 25 and the crosshead guide bars 50 is supported by the tie bars 20. In that case, there is an imbalance between the upper load and the lower load: the load applied to the lower tie bars 20 is larger than the load applied to the upper tie bars 20.

Because of the load imbalance, the lower tie bars 20 will bend when the tie bars 20 have low rigidity, resulting in loss of the posture of the crosshead 25.

On the other hand, in this embodiment the guide bar support members 54 are supported not by the tie bars 20 but by the frame 11 via the support blocks 56 which are slidable on the upper surface of the frame 11. Accordingly, in this embodiment the load of the crosshead 25 and the crosshead guide bars 50 is received by the frame 11. This can prevent loss of the posture of the crosshead 25 due to deflection of the tie bars 20 without increasing the rigidity of the tie bars 20, thus making it possible to stably maintain the posture of the crosshead 25.

As described hereinabove, according to this embodiment, the posture of the crosshead 25 can be stably maintained without using tie bars having a higher rigidity, such as larger-sized ones. Since no biased load is therefore applied to parts such as the guide bushes 55, it becomes possible to prevent early wear of the tie bars 20 and to thereby use the tie bars 20 over a long period of time.

Second Embodiment

A mold clamping apparatus according to a second embodiment of the present invention will now be described with reference to FIG. 4.

The mold clamping apparatus 10 of the second embodiment is the same as that of the first embodiment in that the guide bar support members 54 are supported by the upper surface of the frame 11 via the support blocks 56. However, in the mold clamping apparatus 10 of the second embodiment, a pair of second support members 60 (60a, 60b) are used in combination with the support block (first support member) 56 in order to support each guide bar support member 54 from different directions.

Figure 4:
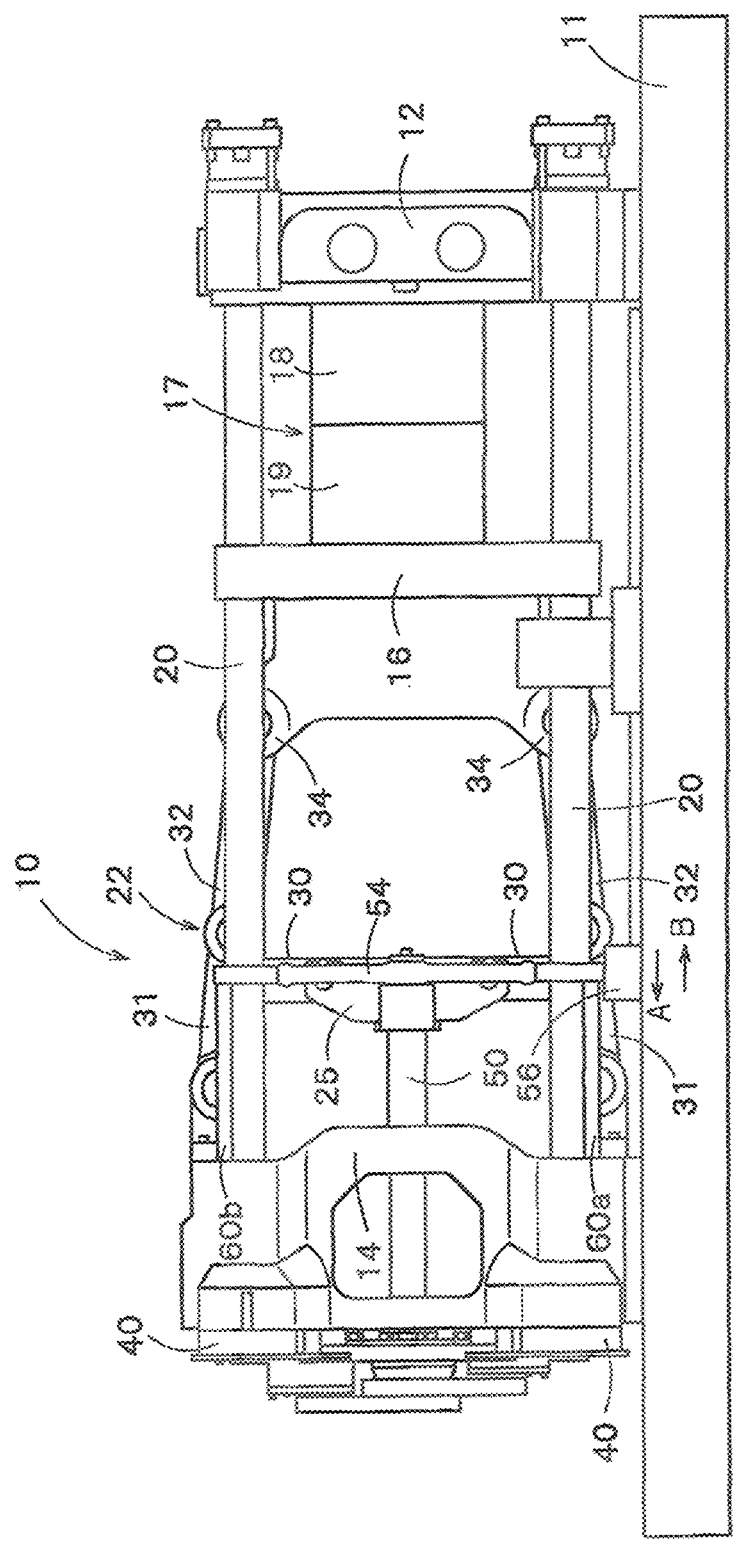
FIG. 4 is a side view of an opening/closing apparatus according to a second embodiment of the present invention.

Referring to FIG. 4, the second support members 60a, 60b are members that support the upper and lower ends of each guide bar support member 54 from a horizontal direction. One end of the second support member 60a, 60b is secured to the link housing 14, while the other end is secured to the upper/lower end of each guide bar support member 54. The second support members 60a, 60b each bridge the link housing 14 and the bar support member 54 and extend parallel to the tie bars 20.

Guide bushes 55 are provided in upper and lower end portions of each guide bar support member 54 (see FIG. 3), and the tie bars 20 are inserted into the guide bushes 55. However, the guide bar support members 54 need not necessarily be guided by the tie bars 20 via the guide bushes 55.

The operation and the effect of the thus-constructed mold clamping apparatus of the second embodiment will now be described.

As in the first embodiment, also in the second embodiment the guide bar support members 54 are supported not by the tie bars 20 but by the frame 11 in the vertical direction via the support blocks 56 which are slidable on the upper surface of the frame 11. Accordingly, also in the second embodiment the load of the crosshead 25 and the crosshead guide bars 50 is received by the frame 11. This can prevent loss of the posture of the crosshead 25 due to deflection of the tie bars 20 without increasing the rigidity of the tie bars 20, thus making it possible to stably maintain the posture of the crosshead 25.

Further, in the second embodiment, the second support members 60a, 60b are used in combination with the first support member 56 in order to support each guide bar support member 54 from a horizontal direction. This can achieve the following effects.

In a mold thickness adjustment operation after replacement of the mold 17, the positions of the link housing 14, the toggle link mechanism 22 and the movable platen 16 are changed together.

In the mold thickness adjustment operation, the guide bar support members 54 move together with the link housing 14, and the first support members 56 slide on the upper surface of the frame 11. A slide resistance is generated at the bottom surfaces of the first support members 56 sliding on the upper surface of the frame 11.

The first support members 56 move either in the mold-closing direction or in the mold-opening direction depending on the thickness of the replaced mold 17. When the guide bar support members 54 move in the mold-closing direction, the slide resistance acts in the direction of arrow A, generating a force to tilt the guide bar support members 54. However, the tilting of the guide bar support members 54 is prevented by the lower second support members 60a that support the guide bar support members 54 against the slide resistance.

Similarly, when the guide bar support members 54 move in the mold-opening direction, the slide resistance acts in the direction of arrow B, generating a force to tilt the guide bar support members 54. However, the tilting of the guide bar support members 54 is prevented by the upper second support members 60b that support the guide bar support members 54 against the slide resistance.

The guide bar support members 54 are thus subjected to the slide resistance of the first support members 56 upon the mold thickness adjustment operation. However, the second support members 60a, 60b act as struts on the upper and lower ends of the guide bar support members 54 and can securely prevent the guide bar support members 54 from tilting. The posture of the crosshead 25 can therefore be maintained.

While the opening/closing apparatus according to the present invention has been described with reference to preferred embodiments in which the present invention is applied in an injection molding machine, the present invention can also be applied to a mold clamping apparatus for use in a die-cast machine, a transfer molding machine, a press molding machine, etc.

The invention claimed is:
1. An opening/closing apparatus comprising:
 a pressure-receiving plate;
 a fixed platen to which a fixed mold is to be mounted;
 a frame on which the pressure-receiving plate and the fixed platen are installed;
 a movable platen which is movable on the frame and to which a movable mold is to be mounted;
 a crosshead movement mechanism including guide members extending from the pressure-receiving plate, and a crosshead whose movement is guided by the guide members;
 an opening/closing mechanism for opening/closing a mold, including a toggle link mechanism connecting the pressure-receiving plate, the crosshead and the movable platen, and a drive mechanism for driving the toggle link mechanism; and
 a guide member support mechanism for supporting the guide members, wherein the guide member support mechanism has support portions which are slidable on an upper surface of the frame.

2. The opening/closing apparatus according to claim 1,
wherein front end portions of two horizontal arms of the crosshead each slidably fit around each of the guide members, and
wherein the guide member support mechanism includes columnar guide member support members which support the guide members and which are disposed on both sides of the crosshead.

3. The opening/closing apparatus according to claim 2,
wherein the guide member support members are each provided at the lower end with a support block as the support portion which is slidable on the upper surface of the frame.

4. The opening/closing apparatus according to claim 3,
wherein tie bars slidably fit, via guide bushes, into upper and lower portions of each guide member support member.

5. The opening/closing apparatus according to claim 2,
wherein the guide member support mechanism includes a first support member and a second support member which support each guide member support member from different directions, and
wherein the first support member is slidable on the upper surface of the frame, and the second support member, at its one end, is connected to the pressure-receiving plate and, at the other end, is connected to the first support member.

6. The opening/closing apparatus according to claim 5,
wherein the first support member is a support block provided at the lower end of each guide member support member and which supports the guide member support member in the vertical direction, and the second support member supports the guide member support member from a horizontal direction.

7. The opening/closing apparatus according to claim 6,
wherein the second support member is composed of a pair of support members which support the upper and lower ends of each guide member support member from a horizontal direction.

8. The opening/closing apparatus according to claim 1,
wherein the opening/closing apparatus is a mold clamping apparatus for opening/closing and clamping a mold in a molding apparatus.

9. The opening/closing apparatus according to claim 1,
wherein the opening/closing apparatus is a mold clamping apparatus provided in an injection molding machine.

10. A molding apparatus comprising the opening/closing apparatus according to claim 1.

\* \* \* \* \*